(12) United States Patent
Berthelot et al.

(10) Patent No.: US 11,659,241 B2
(45) Date of Patent: May 23, 2023

(54) METHODS, SYSTEMS, ARTICLES OF MANUFACTURE, AND APPARATUS FOR ADAPTIVE METERING

(71) Applicant: The Nielsen Company (US), LLC, New York, NY (US)

(72) Inventors: Travis Berthelot, Lewisville, TX (US); Nigel Smith, Richardson, TX (US); Sanjeev Viswambharan, Frisco, TX (US); Achilleas Papakostas, Dallas, TX (US); Pankaj Bengani, Mumbai (IN); Pararth Sanjiv Mehta, Vadodara (IN)

(73) Assignee: THE NIELSEN COMPANY (US), LLC, New York, NY (US)

( * ) Notice: Subject to any disclaimer, the term of this patent is extended or adjusted under 35 U.S.C. 154(b) by 0 days.

(21) Appl. No.: 17/244,667

(22) Filed: Apr. 29, 2021

(65) Prior Publication Data
US 2022/0353574 A1 Nov. 3, 2022

(51) Int. Cl.
| | | |
|---|---|---|
| *H04N 21/442* | (2011.01) | |
| *G06N 20/00* | (2019.01) | |
| *H04N 21/414* | (2011.01) | |
| *H04W 4/18* | (2009.01) | |
| *H04W 4/23* | (2018.01) | |

(52) U.S. Cl.
CPC ....... *H04N 21/44222* (2013.01); *G06N 20/00* (2019.01); *H04N 21/41407* (2013.01); *H04W 4/18* (2013.01); *H04W 4/23* (2018.02)

(58) Field of Classification Search
CPC ....... H04N 21/44222; H04N 21/44213; H04N 21/41407; H04N 21/233
See application file for complete search history.

(56) References Cited

U.S. PATENT DOCUMENTS

| | | |
|---|---|---|
| 9,210,208 B2 | 12/2015 | Ramaswamy et al. |
| 9,615,114 B2 | 4/2017 | Wright et al. |
| 9,838,281 B2 | 12/2017 | Besehanic et al. |
| 2009/0070797 A1* | 3/2009 | Ramaswamy ... H04N 21/44213 725/10 |
| 2010/0015926 A1 | 1/2010 | Luff |
| 2011/0264663 A1* | 10/2011 | Verkasalo ............... G06F 9/455 707/E17.014 |
| 2014/0380350 A1* | 12/2014 | Shankar ............... H04N 21/233 725/18 |
| 2017/0103588 A1* | 4/2017 | Rajani .................. G07C 5/0808 |
| 2018/0213281 A1 | 7/2018 | Srinivasan et al. |

OTHER PUBLICATIONS

Pelegrin, Williams, "LastPass will not be affected by Google's changes to Accessibility Services," Android Authority, Nov. 16, 2017, Retrieved from the Internet: <https://www.androidauthority.com/lastpass-google-accessibility-services-815528/> 3 pages.

(Continued)

*Primary Examiner* — Joshua D Taylor
(74) *Attorney, Agent, or Firm* — Hanley, Flight & Zimmerman, LLC

(57) ABSTRACT

Methods, systems, articles of manufacture, and apparatus for adaptive metering are disclosed. An example apparatus disclosed herein includes a condition analyzer to determine a condition associated with a mobile device, a meter selector to select a meter for the mobile device based on the condition, and a data collector to collect data pertaining to the mobile device based on the selected meter.

19 Claims, 10 Drawing Sheets

(56) References Cited

OTHER PUBLICATIONS

Maring, Joe, "Google temporarily pauses ban of apps using Accessibility Services," Phew, Dec. 7, 2017, Retrieved from the Internet: https://web.archive.org/web/20171208150239/https://www.androidcentral.com/google-temporarily-pauses-ban-apps-using-accessibility-services> 6 pages.

Merriman, Chris, "Google puts 30-day hold on plans to ban use of Android Accessibility Services," The Inquirer, Dec. 11, 2017, Retrieved from the Internet: <https://web.archive.org/web/20191224025351/https://www.theinquirer.net/inquirer/news/3022815/google-puts-30-day-hold-on-plans-to-ban-use-of-android-accessibility-services> 2 pages.

Rahman, Mishaal, "Google May Remove Access to Undocumented/Hidden APIs In Android P," XDA, Feb. 28, 2018, Retrieved from the Internet: <https://www.xda-developers.com/google-undocumented-hidden-apis-androidp/> 8 pages.

Zora, Zeljka, "Google will remove apps that misuse Android Accessibility Services from Google Play," Help Net Security, Nov. 13, 2017, Retrieved from the Internet: <https://www.helpnetsecurity.com/2017/11/13/android-accessibility-services-misuse/> 4 pages.

Dent, Steve, "Google cracks down on apps that misuse accessibility features," Engadget, Nov. 13, 2017, Retrieved from the Internet<https://www.engadget.com/2017-11-13-google-cracks-down-accessibility-features.html> 8 pages.

Lefebvre, Rob, "Google pauses crackdown on apps that use accessibility features," Engadget, Dec. 8, 2017, Retrieved from the Internet: <https://www.engadget.com/2017/12/08/google-pauses-crackdown-apps-accessibility-features/> 6 pages.

\* cited by examiner

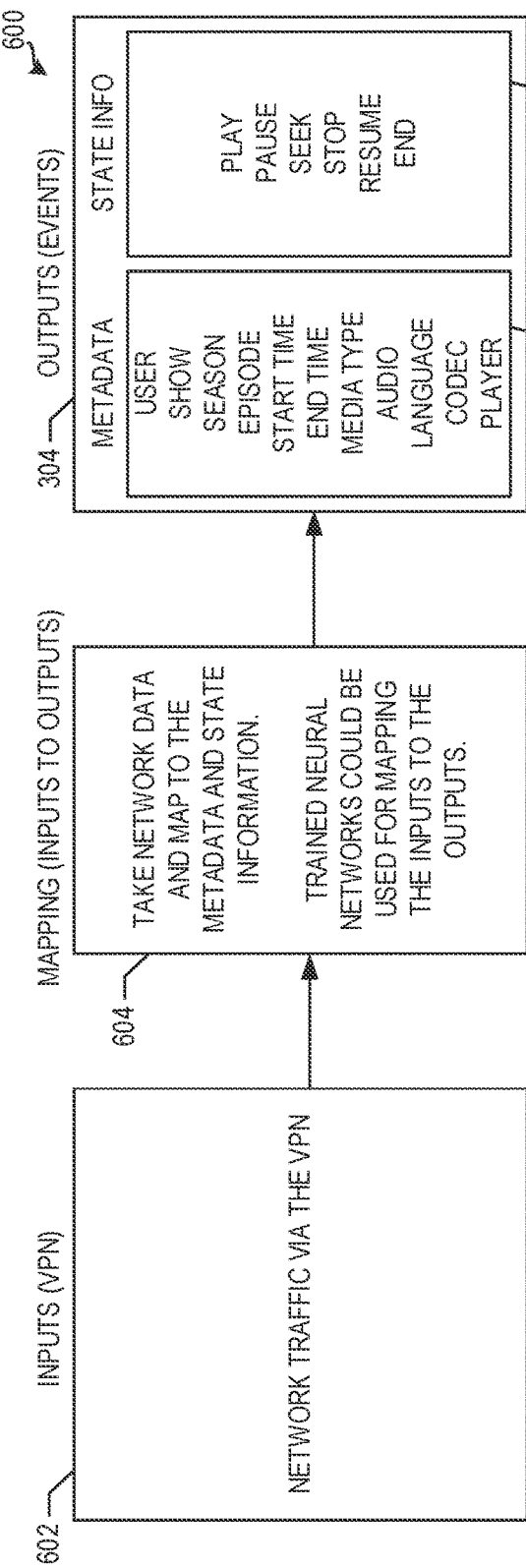
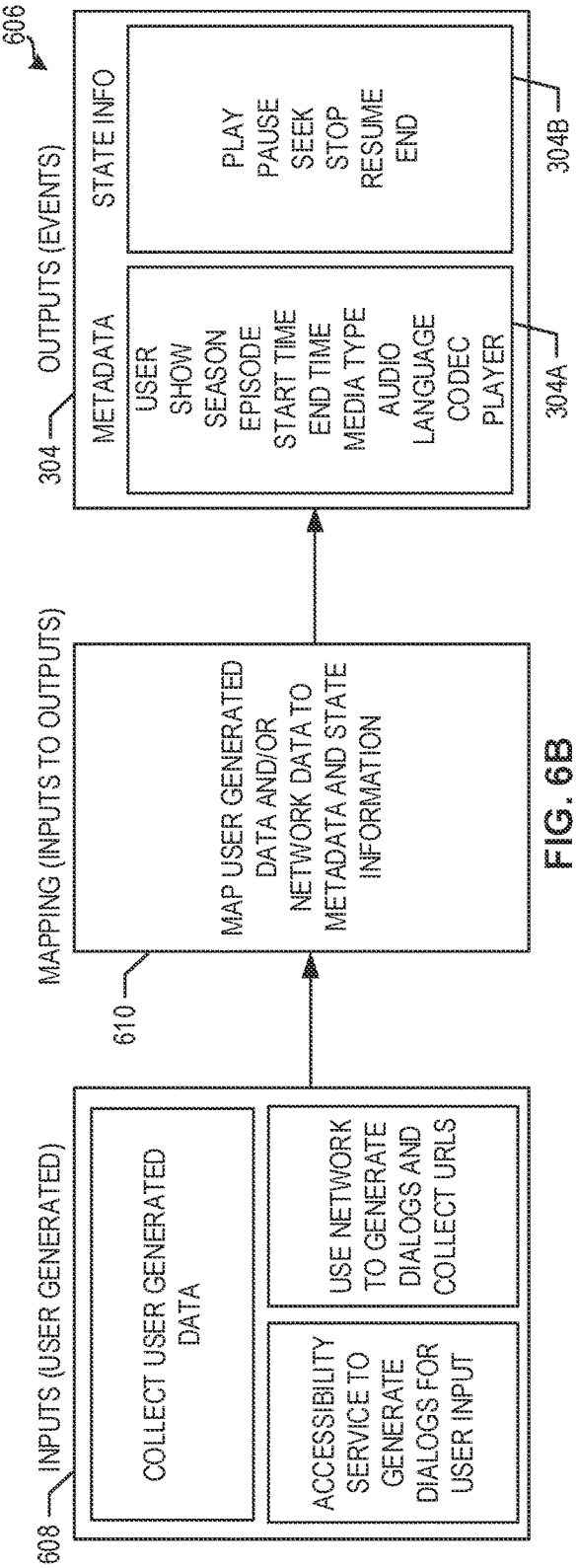
FIG. 6A
FIG. 6B

METHODS, SYSTEMS, ARTICLES OF MANUFACTURE, AND APPARATUS FOR ADAPTIVE METERING

FIELD OF THE DISCLOSURE

This disclosure relates generally to data collection and, more particularly, to methods, systems, articles of manufacture, and apparatus for adaptive metering.

BACKGROUND

Media content can be delivered to and presented by a wide variety of content presentation devices such as desktop computers, laptop computers, tablet computers, personal digital assistants, smartphones, etc. Because a significant portion of media content is presented to such devices, monitoring of media content can provide valuable information to advertisers, content providers, and the like.

SUMMARY

An example apparatus disclosed herein includes a condition analyzer to determine a condition associated with a mobile device, a meter selector to select a meter for the mobile device based on the condition, and a data collector to collect data pertaining to the mobile device based on the selected meter.

An example apparatus disclosed herein includes a memory storing instructions and a processor to execute the instructions to determine a condition associated with a mobile device, select a meter for the mobile device based on the condition, and collect data pertaining to the mobile device based on the selected meter.

An example non-transitory computer readable medium disclosed herein includes instructions that, when executed, cause at least one processor to determine a condition associated with a mobile device, select a meter for the mobile device based on the condition, and collect data pertaining to the mobile device based on the selected meter.

BRIEF DESCRIPTION OF THE DRAWINGS

FIG. 6A is a block diagram of a sixth example process flow that can be implemented by the example adaptive metering controller of FIG. 2 utilizing network traffic.

FIG. 6B is a block diagram of a seventh example process flow that can be implemented by the example adaptive metering controller of FIG. 2 utilizing user-generated inputs.

The figures are not to scale. In general, the same reference numbers will be used throughout the drawing(s) and accompanying written description to refer to the same or like parts.

Figure 1:
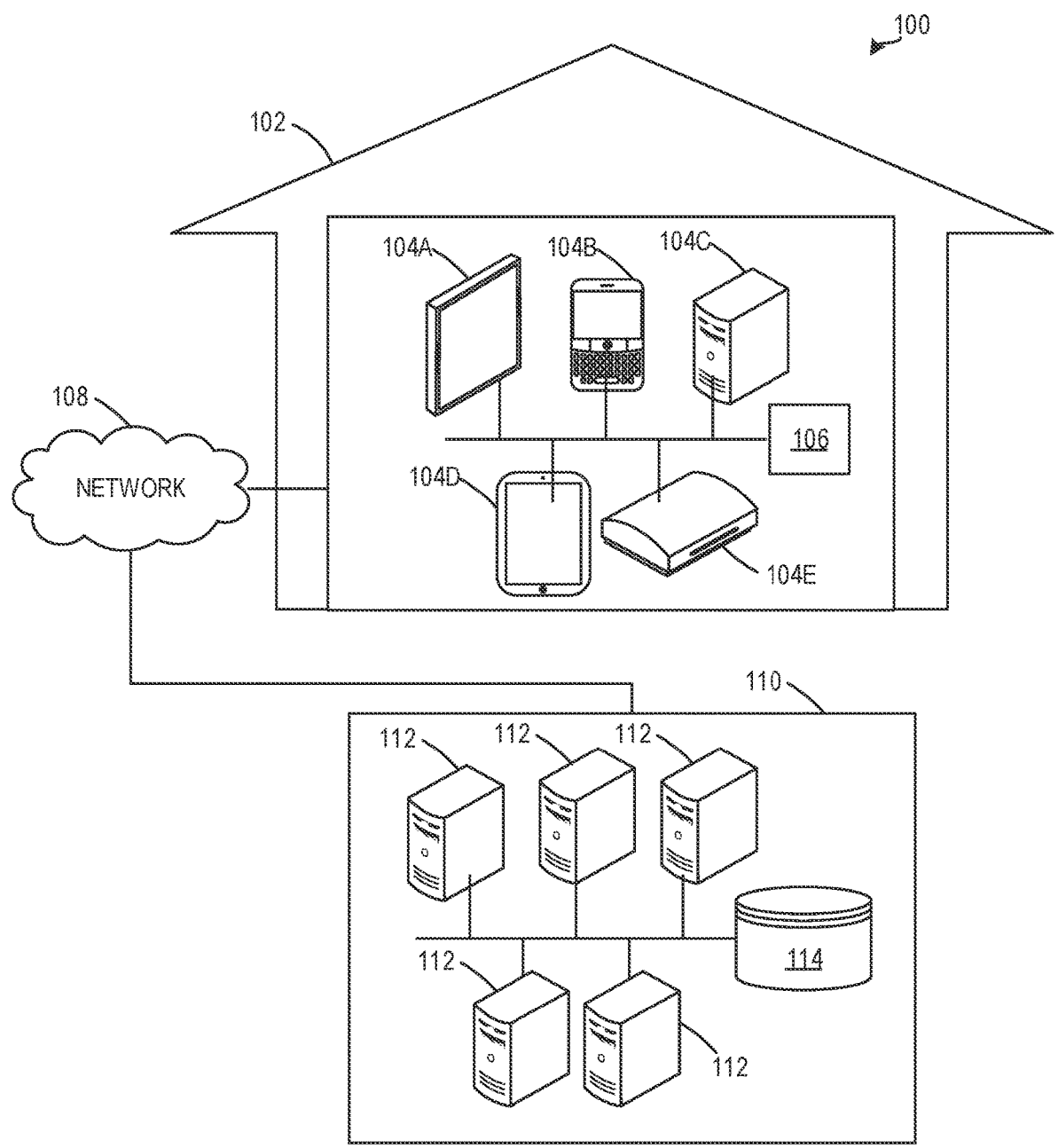
FIG. 1 illustrates an example environment in which examples disclosed herein can be implemented.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Adaptive metering is disclosed. In many cases, media content presented on a mobile device can be monitored using one or more meters implemented on the mobile device. In some cases, data collected using each of the meters may be different, and some or all of the data collected for one of the meters may overlap with data collected for different ones of the meters. Furthermore, ones of the meters can become unavailable, or can provide incomplete and/or inaccurate data. As such, the meters used for monitoring media content can be selected to ensure that a desired accuracy and/or type of data is collected.

In examples disclosed herein, an example adaptive metering controller is configured to select between one or more meters for collecting data associated with a mobile device. In some examples, each of the meters collects the data based on a different number and/or type of inputs. In examples disclosed herein, the adaptive metering controller determines a condition associated with the mobile device, where the condition includes at least one of a desired accuracy of the data and/or one or more panels to which a user of the mobile device belongs. In some examples, based on the condition, the adaptive metering controller selects a meter and/or a combination of meters, and collects input data from the mobile device using the selected meter or combination of meters. In some examples, the input data is associated with media presented via an application on the mobile device. In some examples, the adaptive metering controller can obtain output data directly from the input data. The output data may include information associated with the presented media such as a title, episode, start time, end time, audio language, etc. In other examples, the adaptive metering controller selects and/or generates a mapping to map the input data to the output data.

Advantageously, examples disclosed herein enable the adaptive metering controller to adaptively configure the number and/or type of meters used for collecting data. For example, the adaptive metering controller can collect data using a first meter, then switch to a second meter different from the first meter in response to the first meter becoming unavailable and/or providing inaccurate data. As such, examples disclosed herein enable continuous (e.g., without interruption) monitoring of media content on the mobile device while ensuring that the collected data satisfies a threshold accuracy.

FIG. 1 illustrates an example environment 100 in which examples disclosed herein can be implemented. The example environment 100 supports monitoring of media presented at one or more monitored sites, such as an example monitored site 102 illustrated in FIG. 1, and includes example media devices (e.g., a media presentation devices) 104. Although the example of FIG. 1 illustrates one of the monitored site 102 and five of the media devices 104, examples disclosed herein can be implemented in environments 100 supporting any number of monitored sites 102 having any number of the media devices 104. Further, examples disclosed herein can be implemented in any appropriate network configuration and/or topology.

The environment 100 of the illustrated example includes an example adaptive metering controller 106 to monitor media presented by the media devices 104. In the illustrated example, the media monitored by the adaptive metering controller 106 can correspond to any type of media presentable by the media devices 104. For example, monitored media can correspond to media content, such as television programs, radio programs, movies, Internet video, video-on-demand, etc., as well as commercials, advertisements, etc. In this example, the adaptive metering controller 106 determines metering data that may identify and/or be used to identify media presented by the media devices 104 (and, thus, infer media exposure) at the monitored site 102. The adaptive metering controller 106 then stores and reports this metering data via an example network 108 to an example data processing facility 110.

In this example, the data processing facility 110 performs any appropriate post-processing of the metering data to, for example, determine audience ratings information, identify targeted advertising to be provided to the monitored site 102, etc. In this example, the data processing facilities includes example servers 112 and an example central database 114. In some examples, the post-processing of the metering data is performed on one or more of the servers 112. In some examples, the central database 114 can store the metering data from the adaptive metering controller 106 and/or processed metering data from the servers 112. In the illustrated example, the network 108 can correspond to any type(s) and/or number of wired and/or wireless data networks, or any combination thereof.

In the illustrated example, each of the media devices 104 monitored by the adaptive metering controller 106 can correspond to any type of audio, video and/or multimedia presentation device capable of presenting media audibly and/or visually. For example, each of the media devices 104 can correspond to a multimedia computer system, a personal digital assistant, a cellular/mobile smartphone, a radio, a tablet computer, etc.

In examples disclosed herein, the adaptive metering controller 106 can be implemented by or otherwise included in each of the media devices 104. This example implementation can be especially useful in scenarios in which a media monitoring application is executed on the media devices 104, but the media devices 104 prevents (e.g., via digital rights management or other techniques) third-party applications, such as the media monitoring application, from accessing protected media data stored on the media device 104.

Figure 2:
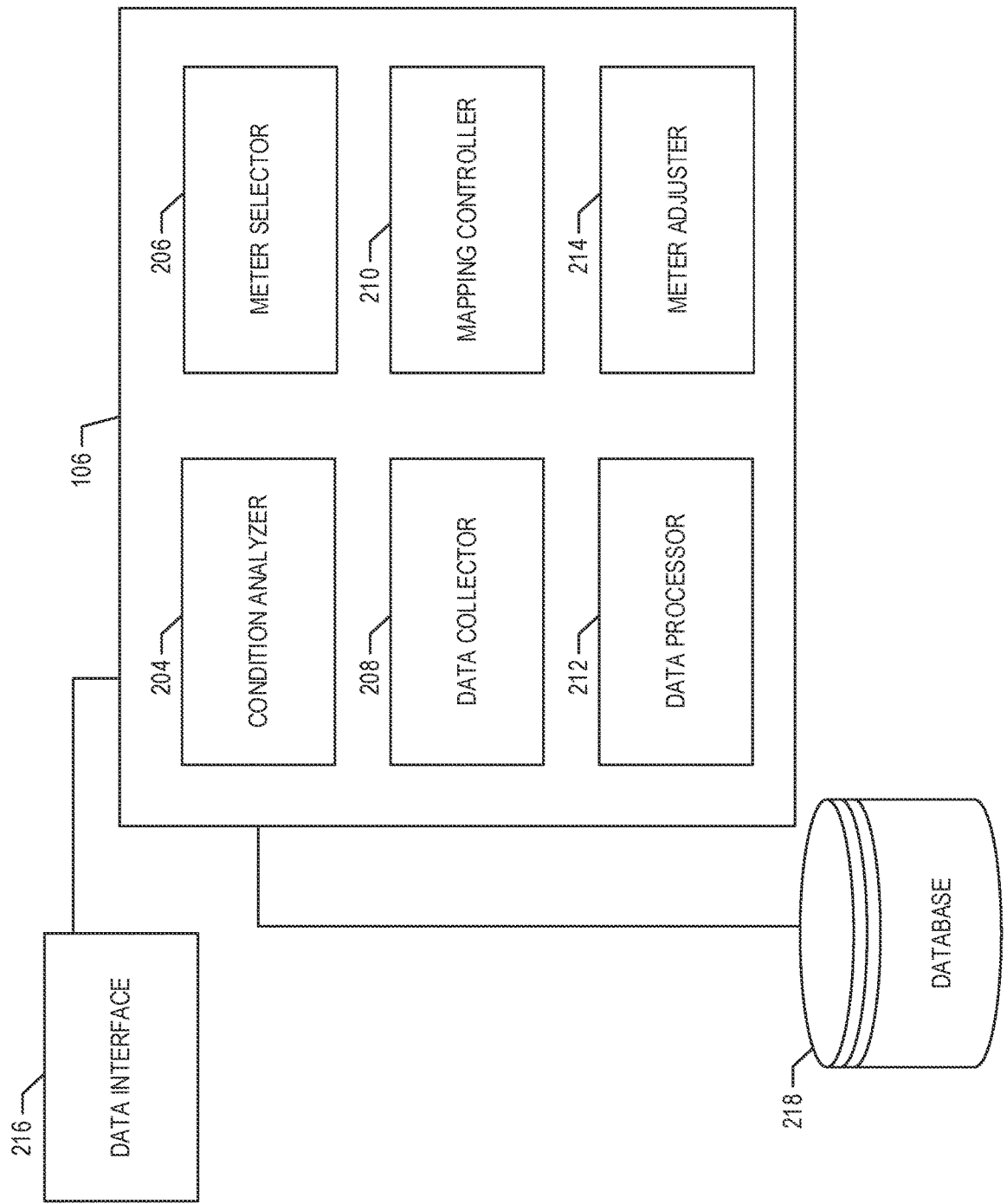
FIG. 2 is a block diagram of an example adaptive metering controller in accordance with teachings of this disclosure.

FIG. 2 is a block diagram of the example adaptive metering controller 106 of FIG. 1. In examples disclosed herein, the adaptive metering controller 106 can be implemented in the media device 104 of FIG. 1, and the adaptive metering controller 106 is configured to select between one or more meters for collecting metering data associated with the media device 104. In the illustrated example of FIG. 2, the adaptive metering controller 106 includes an example condition analyzer 204, an example meter selector 206, an example data collector 208, an example mapping controller 210, an example data processor 212, and an example meter adjuster 214. In this example, the adaptive metering controller 106 is communicatively coupled to the example network 108 and/or the media device 104 of FIG. 1 via an example data interface 216. Furthermore, the adaptive metering controller 106 is communicatively coupled to an example database 218. In some examples, the database 218 is implemented on one or more of the media devices 104.

In this example, the condition analyzer 204 determines a condition associated with the media device 104. In some examples, the condition includes a desired accuracy of the metering data collected from the media device 104. In some such examples, accuracy of the metering data is based on a number and/or types of meters available for the media device 104. Additionally or alternatively, the condition corresponds to one or more panels to which a user of the media device 104 belongs. In such examples, the condition analyzer 204 identifies the one or more panels, and further identifies a type of output data required by each of the one or more panels.

The meter selector 206 of the illustrated example selects one or more meters for the media device 104 based on the condition. For example, when the condition corresponds to a desired accuracy level of the metering data, the meter selector 206 selects the type and/or number of the meters that satisfies a threshold, where the threshold is based on the desired accuracy level. In other examples, the meter selector 206 selects the one or more meters based on the type of output data required by each of the one or more panels associated with the media device 104. In some examples, the meter selector 206 selects the one or meters based on a lack of data (e.g., incomplete data, inconsistent data, etc.). Additionally or alternatively, the meter selector 206 selects the one or more meters based on a triggering event (e.g., an opening of an application, initiating content streaming, selecting a menu option, etc.).

The example data collector 208 collects the metering data pertaining to the media device 104 based on the one or more selected meters. For example, the data collector 208 can collect the metering data using at least one of an accessibility service, intent filters, firmware, one or more external devices associated with the mobile device, user-generated inputs, or network traffic. In some examples, the data collector 208 collects the metering data from the media device 104 via the data interface 216.

The mapping controller 210 of the illustrated example generates a mapping to map the metering data to one or more outputs (e.g., events). For example, the mapping controller 210 generates the mapping based on the metering data collected by the data collector 208 and the type of output data required. In some examples, the mapping includes at least one of a machine learning model or a neural network model. In some examples, the mapping controller 210 selects the mapping from one or more generated mappings previously generated by the mapping controller 210. In some such examples, the generated mappings can be stored in the database 218. In some examples, the mapping controller 210 maps the metering data to the one or more outputs, and/or the mapping controller 210 provides the selected and/or generated mapping to the data processor 212 to perform the mapping.

The example data processor 212 organizes and/or processes the metering data. For example, the data processor 212 can use the mapping provided by the mapping controller 210 to generate the output data and/or events based on the metering data. In other examples, based on the type of metering data being collected, the data processor 212 can directly obtain the output data from the metering data (e.g., without the mapping). In some examples, the data processor 212 can provide the output data and/or the metering data to the database 218 and/or to the central database 114 of FIG. 1 via the data interface 216.

The example meter adjuster 214 adjusts and/or modifies the one or more meters associated with the media device 104. For example, in response to the metering data not satisfying the condition (e.g., not satisfying a threshold accuracy), the meter adjuster 214 can select a new meter for use by the data collector 208. In some examples, the meter adjuster 214 can remove and/or inactivate one or more of the meters in response to the meters becoming unavailable and/or providing inaccurate data. In other examples, the meter adjuster 214 can add one or more new meters in response to new input data from the media device 104 becoming available. In some such examples, the meter adjuster 214 can add the one or more new meters in response to a new external device (e.g., camera, microphone, etc.) being connected to the media device 104. In some other examples, the meter adjuster 214 can adjust and/or vary settings of selected meters (e.g., to increase an accuracy thereof).

In this example, the database 218 stores metering data and/or processed metering data utilized and/or generated by the adaptive metering controller 106. The example database 218 of FIG. 2 is implemented by any memory, storage device and/or storage disc for storing data such as, for example, flash memory, magnetic media, optical media, solid state memory, hard drive(s), thumb drive(s), etc. Furthermore, the data stored in the example database 418 may be in any data format such as, for example, binary data, comma delimited data, tab delimited data, structured query language (SQL) structures, etc. While, in the illustrated example, the example database 218 is illustrated as a single device, the example database 218 and/or any other data storage devices described herein may be implemented by any number and/or type(s) of memories.

Figure 3:
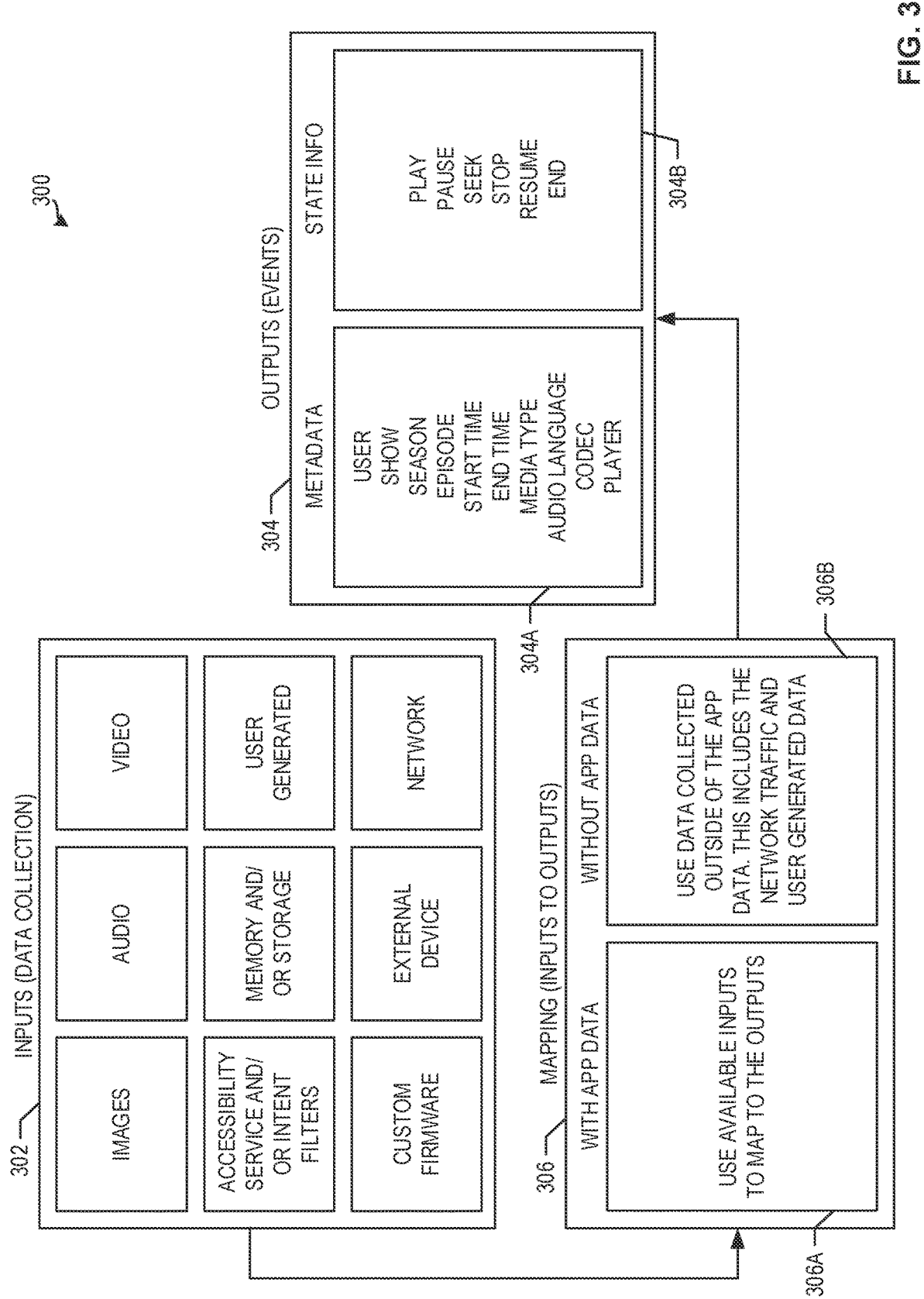
FIG. 3 is a block diagram of a first example process flow that can be implemented in examples disclosed herein.

FIG. 3 is a block diagram of a first example process flow 300 that can be implemented in examples disclosed herein. The first process flow 300 can be executed by the adaptive metering controller 106 of FIGS. 1 and/or 2 to collect data from one or more example inputs 302 associated with the media device 104 of FIG. 1, and map the inputs 302 to example outputs (e.g., events) 304 using an example mapping 306. In this example, the outputs 304 are associated with media presented via an application on the media device 104.

The example inputs 302 can include at least one of image data, audio data, video data, data from an accessibility service, data from intent filters, data from memory and/or storage of the media device 104, data from user-generated inputs, data from custom firmware, data from one or more external devices, or network data. In some examples, the inputs 302 are accessible to the adaptive metering controller 106 and based on the number and/or type of meters selected by the adaptive metering controller 106.

In the illustrated example, the adaptive metering controller 106 selects the mapping 306 based on whether data is available from a third-party application on which the media is being presented. In this example, the adaptive metering controller 106 selects an example first mapping 306A when data is available from the third-party application, and selects an example second mapping 306B when data is not available from the third-party application. In this example, in response to the first mapping 306A being selected, the adaptive metering controller 106 can use one or more of the inputs 302 that are available using the one or more selected meters. In such examples, the adaptive metering controller 106 maps the available inputs 302 to desired ones of the outputs 304 using the first mapping 306A. Alternatively, in response to the second mapping 306B being selected, the adaptive metering controller 106 uses a subset of the inputs 302, where the subset corresponds to data that can be collected without the third-party application. In some examples, the subset of the inputs 302 includes data from the external devices and/or the network traffic. In such examples, the adaptive metering controller 106 maps the subset of the inputs 302 to the desired ones of the outputs 304 using the second mapping 306B.

According to the illustrated example, the outputs 304 include example metadata 304A and example state information 304B associated with the media presented via the application. In some examples, the metadata 304A can include information pertaining to a user of the media device 104. In some examples, the media corresponds to a television show, such that the metadata 304A corresponds to a show, season, episode, start time, end time, media type, audio language, codec, and/or player associated with the presented media. In this example, the state information 304B is determined based on the user interacting with the media. For example, the user can play, pause, seek, stop, resume, and/or end the media based on user-generated inputs, where the user-generated inputs can include pressing a button, giving an audio command, physical contact with a portion of the media device 104, etc. In some such examples, the state information 304B can include timestamps corresponding to each of the user-generated inputs.

Figures 4A, 4B:
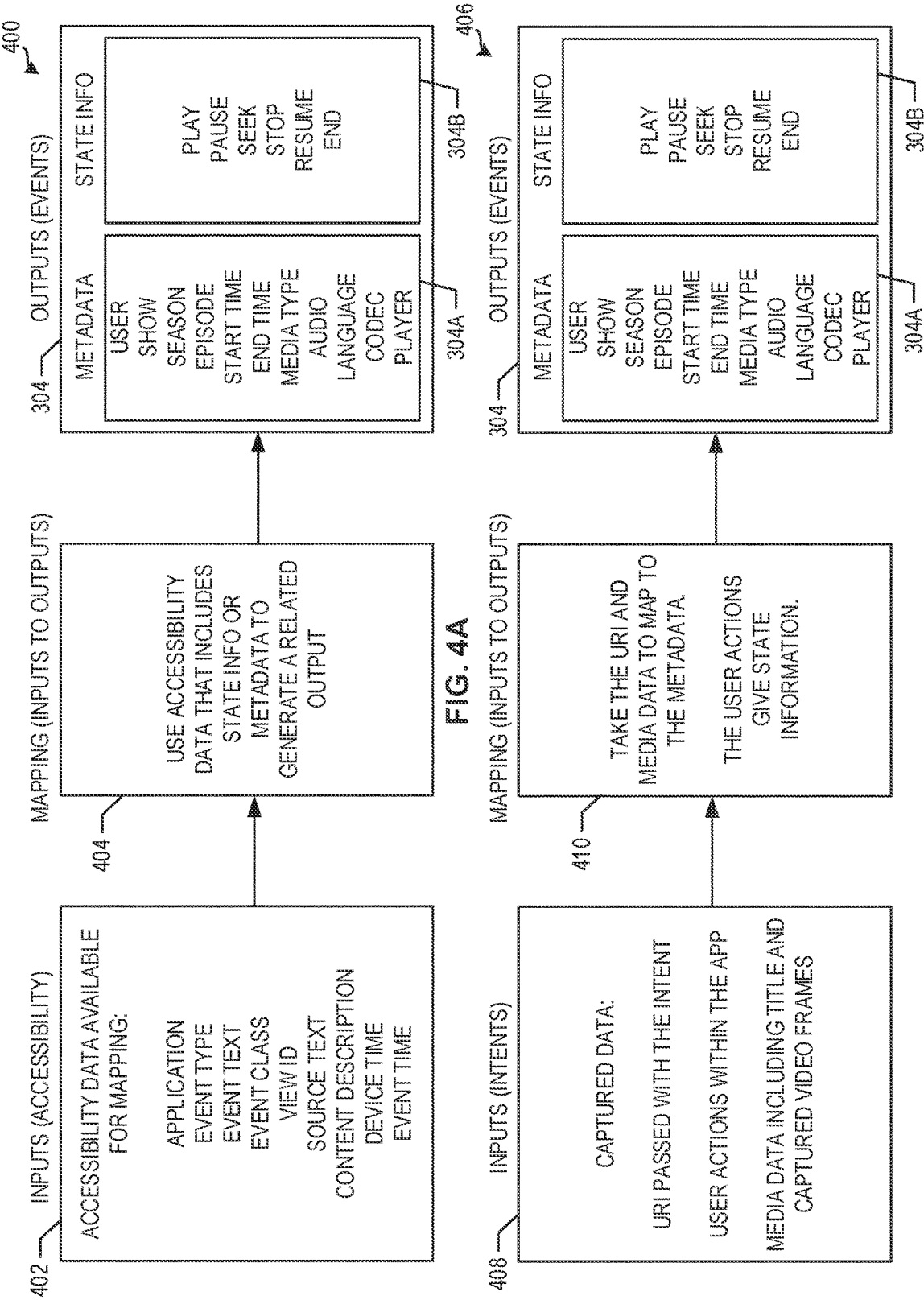
FIG. 4A is a block diagram of a second example process flow that can be implemented by the example adaptive metering controller of FIG. 2 utilizing an accessibility service.
FIG. 4B is a block diagram of a third example process flow that can be implemented by the example adaptive metering controller of FIG. 2 utilizing intent filters.

FIG. 4A is a block diagram of a second example process flow 400 that can be implemented by the example adaptive metering controller 106 of FIG. 2 utilizing an accessibility service. In this example, the meter selector 206 of FIG. 2 selects a first meter for collect data pertaining to the media device 104 of FIG. 1, where the first meter utilizes the accessibility service of the media device 104.

In examples disclosed herein, the accessibility service is installed on the media device 104 to assist users with disabilities in using the media device 104. In some examples, a user of the media device 104 can configure the accessibility service to enable the adaptive metering controller 106 to access to data from an application (e.g., third party application) of the media device 104. For example, the accessibility service can be configured to enable the adaptive metering controller 106 to access example accessibility data 402 using the first meter.

In this example, the data collector 208 of FIG. 2 collects the accessibility data 402 based on the first meter. The accessibility data 402 is based on accessibility events monitored by the accessibility service, where each of the accessibility events indicates a state transition in a user interface of the application. For example, an accessibility event may correspond to the user clicking a button in the application. In this example, the accessibility data 402 can include at least one of the application, an event type, event text, an event class, a view ID, source text, content description, device time, or an event time corresponding to each of the accessibility events.

In the illustrated example, the mapping controller 210 of FIG. 2 can select an example first mapping 404 to map the accessibility data 402 to the example outputs 304. For example, the mapping controller 210 can generate the metadata 304A and the state information 304B based on the accessibility data 402 and the first mapping 404. In some examples, the metadata 304A and the state information 304B can be stored in the database 218 of FIG. 2, or sent to the data processing facility 110 of FIG. 1 via the network 108 of FIG. 1.

FIG. 4B is a block diagram of a third example process flow 406 that can be implemented by the example adaptive metering controller 106 of FIG. 2 utilizing intent filters. In this example, the meter selector 206 of FIG. 2 selects a second meter for collecting data pertaining to the media device 104 of FIG. 1, where the second meter utilizes the intent filters of the media device 104.

In examples disclosed herein, intents can be utilized in the media device 104 to start an activity in an application, where the activity can include presenting media in the application. In some examples, the intents include data associated with the presented media, and intent filters can be configured to specify a type of intent that can be received by the application. In this example, the second meter is configured to access example intent data 408 from the intents. In this example, the intent data 408 includes at least one of a uniform resource indicator (URI) passed with the intent, user actions within the application, or media data including a title of the media and/or captured video frames from the media.

In the illustrated example, the data collector 208 of FIG. 2 collects the intent data 408 based on the second meter. In this example, the mapping controller 210 of FIG. 2 can select an example second mapping 410 to map the intent data 408 to the example outputs 304. For example, the mapping controller 210 can use the second mapping 410 to generate the metadata 304A based on the URI and the media data passed with the intent. In some examples, the mapping controller 210 can determine the state information 304B based on the user actions passed with the intent. In some examples, the metadata 304A and the state information 304B can be stored in the database 218 of FIG. 2, or sent to the data processing facility 110 of FIG. 1 via the network 108 of FIG. 1.

Figure 5A:
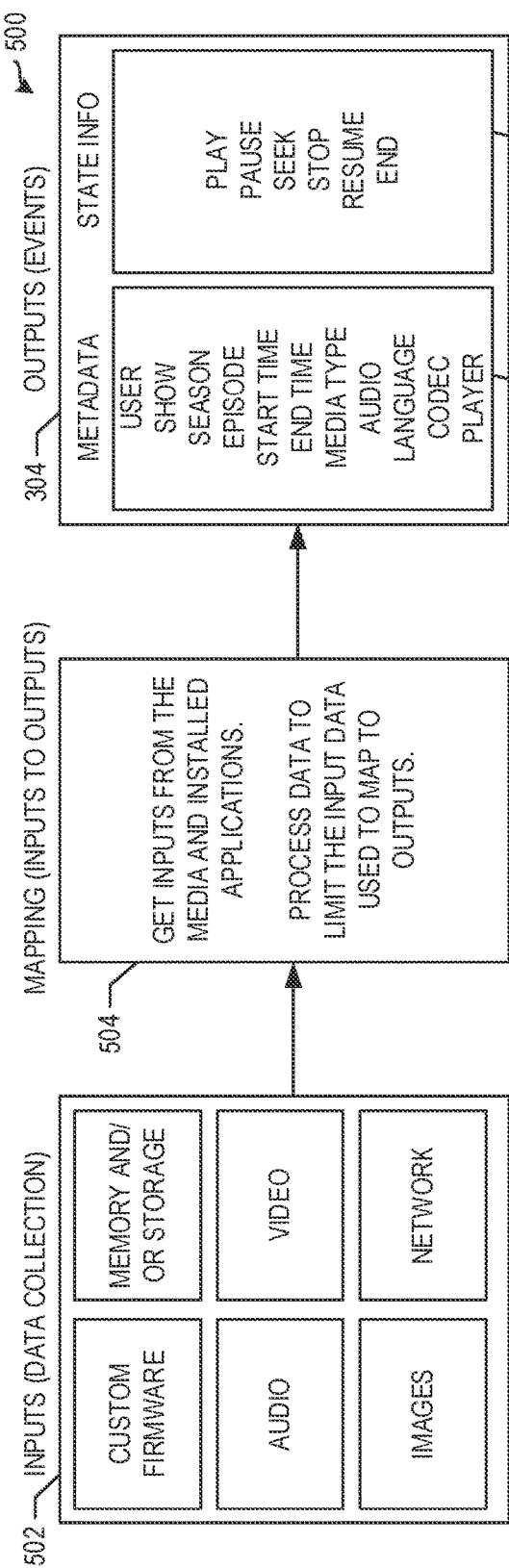
FIG. 5A is a block diagram of a fourth example process flow that can be implemented by the example adaptive metering controller of FIG. 2 utilizing custom firmware.

FIG. 5A is a block diagram of a fourth example process flow 500 that can be implemented by the example adaptive metering controller 106 of FIG. 2 utilizing custom firmware. For example, a user of the media device 104 of FIG. 1 can install the custom firmware onto the media device 104 to enable data collection by the adaptive metering controller 106. In some examples, the custom firmware enables data to be collected from third-party applications. In this example, the meter selector 206 of FIG. 2 selects a third meter for collecting data pertaining to the media device 104, where the third meter utilizes the custom firmware of the media device 104.

In this example, the data collector 208 of FIG. 2 collects example custom firmware data 502 based on the third meter. In some examples, the custom firmware data 502 includes at least one of data from memory and/or storage of the media device 104, audio data, video data, image data, and/or network traffic data. In some such examples, the custom firmware data 502 is associated with media presented by the third-party applications installed on the media device 104. In this example, the mapping controller 210 of FIG. 2 selects an example third mapping 504 to map the custom firmware data 502 to the example outputs 304. For example, the mapping controller 210 can use the third mapping 504 to generate the metadata 304A and the state information 304B based on the custom firmware data 502. In some examples, the data processor 212 can process the custom firmware data 502 prior to mapping, where the processing of the custom firmware data 502 reduces an amount of the data input to the third mapping 504 and, thus, reduces computational load on the adaptive metering controller 106.

Figure 5B:
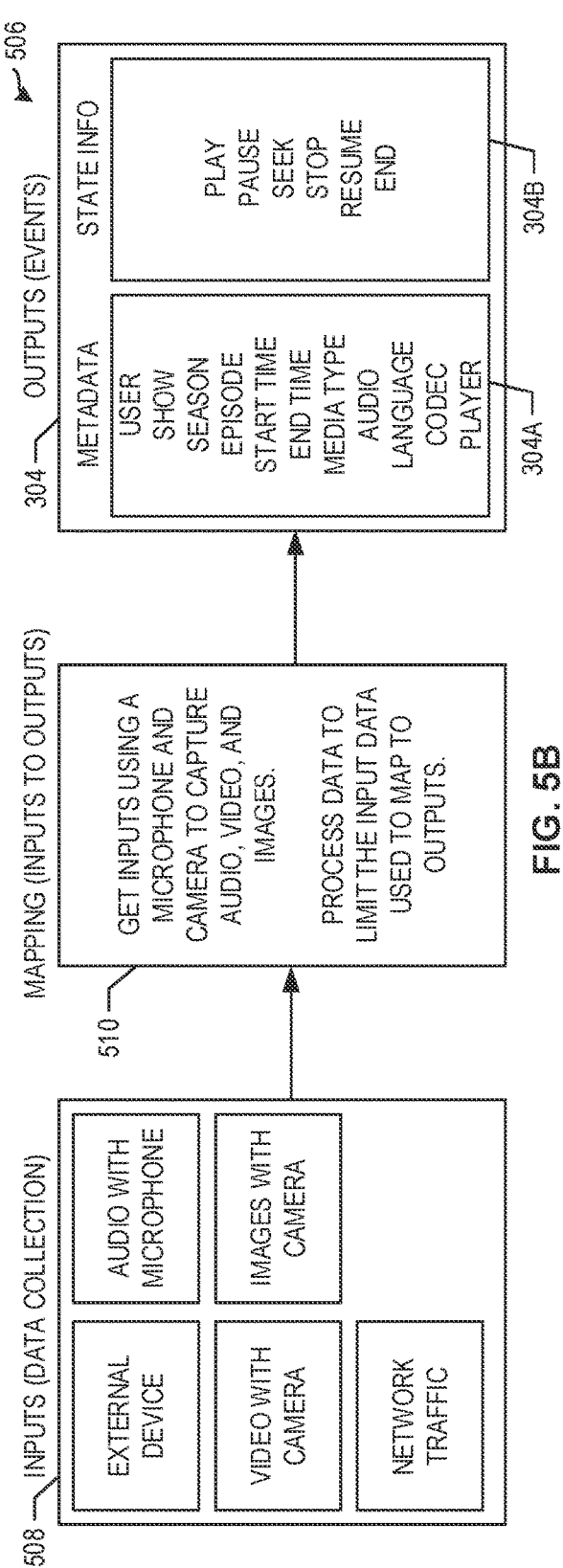
FIG. 5B is a block diagram of a fifth example process flow that can be implemented by the example adaptive metering controller of FIG. 2 utilizing one or more external devices.

FIG. 5B is a block diagram of a fifth example process flow 506 that can be implemented by the example adaptive metering controller 106 of FIG. 2 utilizing external devices. In this example, the external devices include a camera and/or a microphone of the media device 104 of FIG. 1. In this example, the meter selector 206 of FIG. 2 selects a fourth meter for collecting data pertaining to the media device 104, where the fourth meter utilizes the external devices of the media device 104.

In this example, the data collector 208 of FIG. 2 collects example external device data 508 based on the fourth meter. In some examples, the external device data 508 includes at least one audio data captured via the microphone, video data captured via the camera, image data captured via the camera, and/or network traffic data. In some such examples, the external device data 508 is associated with media presented by an application installed on the media device 104. In this example, the mapping controller 210 of FIG. 2 can select an example fourth mapping 510 to map the external device data 508 to the example outputs 304. For example, the mapping controller 210 can use the fourth mapping 510 to generate the metadata 304A and the state information 304B based on the external device data 508. In some examples, the data processor 212 can process the external device data 508 prior to mapping, where the processing of the external device data 508 reduces an amount of the data being input to the fourth mapping 510 to reduce computational load on the adaptive metering controller 106.

FIG. 6A is a block diagram of a sixth example process flow 600 that can be implemented by the example adaptive metering controller 106 of FIG. 2 utilizing network traffic. In this example, example network traffic data 602 is associated with Hypertext Transfer Protocol (HTTP) traffic on a virtual private network (VPN). In this example, the meter selector 206 of FIG. 2 selects a fifth meter for collecting data pertaining to the media device 104, where the fifth meter utilizes the network traffic across the VPN.

In this example, the data collector 208 of FIG. 2 collects the network traffic data 602 based on the fifth meter. In some examples, a subset of the network traffic data 602 is associated with media presented by one or more third-party applications installed on the media device 104. In some examples, the data collector 208 uses artificial intelligence (AI) and/or machine learning (ML) techniques to develop a trained model to select the subset of the network traffic data 602 that includes information relevant to the outputs 304. In some such examples, the mapping controller 210 of FIG. 2 can select an example fifth mapping 604 to map the network traffic data 602 and/or the subset of the network traffic data 602 to the example outputs 304. For example, the mapping controller 210 can use the fifth mapping 604 to generate the metadata 304A and the state information 304B based on the network traffic data 602. In some examples, the mapping controller 210 generates and/or trains a neural network/ML model to be implemented to generate the fifth mapping 604. In particular, the neural network can be trained based on data parameters (e.g., accuracy metrics, etc.) associated with the inputs 602 and/or the outputs 304. In other examples, the fifth mapping 604 is generated manually or using string comparisons.

FIG. 6B is a block diagram of a seventh example process flow 606 that can be implemented by the example adaptive metering controller 106 of FIG. 2 utilizing user-generated inputs. In this example, the meter selector 206 of FIG. 2 selects a sixth meter for collecting data pertaining to the media device 104, where the sixth meter utilizes the user-generated inputs.

In this example, a dialog and/or request for input may be presented to a user of the media device 104 when media is played on the media device 104. In some examples, the user may be prompted by the dialog to input information pertaining to the media being played. In some examples, the dialog is generated based on the accessibility service of the media device 104 or based on network traffic. In this example, example user-generated data 608 includes the information input by the user in the dialog. As such, the mapping controller 210 of FIG. 2 can select an example sixth mapping 610 to map the user-generated data 608 to the example outputs 304. In some examples, the information input by the user can include one or more of the outputs 304. In such examples, the data collector 208 of FIG. 2 can directly (e.g., without the sixth mapping 610) obtain the outputs 304 using the fifth meter.

Figure 7:
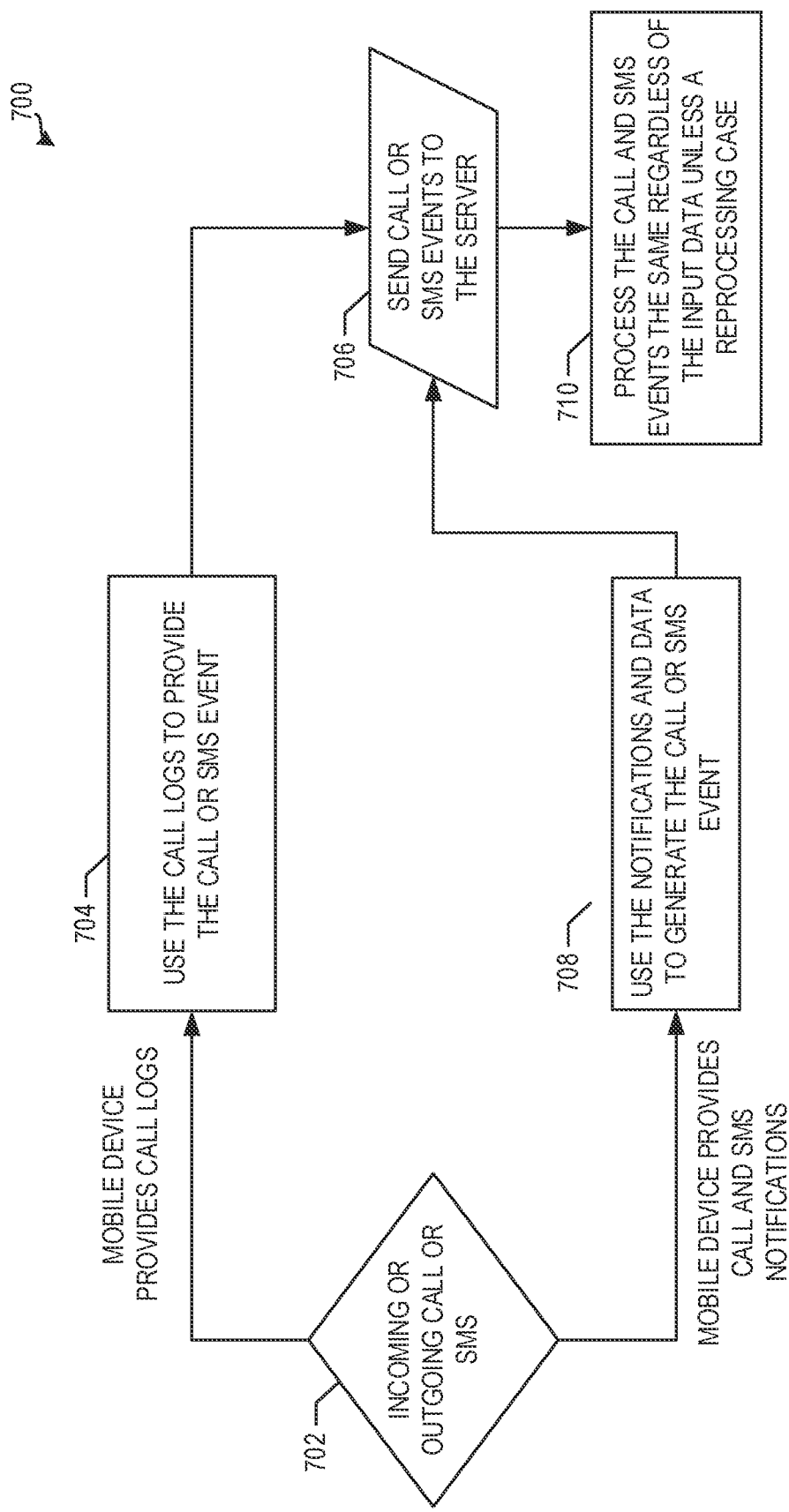
FIG. 7 is a block diagram of an eighth example process flow that can be implemented by the example adaptive metering controller of FIG. 2 to process call and/or SMS data.

FIG. 7 is a block diagram of an eighth example process flow 700 that can be implemented by the example adaptive metering controller 106 of FIG. 2 to process call and/or SMS (short message service) data. In this example, a mobile device (e.g., the media device 104 of FIG. 1) can at least receive an incoming call, receive an incoming SMS message, send an outgoing call, and/or send an outgoing SMS message. In one example, in response to an example incoming or outgoing call or SMS message 702, the mobile device provides call logs to the adaptive metering controller 106. In some examples, the meter selector 206 of FIG. 2 selects an example seventh meter, and the data collector 208 of FIG. 2 can obtain the call logs using the seventh meter. The call logs may include a call or SMS event based on the incoming or outgoing call or SMS message 702. In such examples, at the call log provision 704, the data processor 212 of FIG. 2 can determine the call or SMS events based on the call logs. In this example, at the sending of the call or SMS events 706, the data processor 212 sends the call or SMS events to one or more of the servers 112 of the data processing facility 110 of FIG. 1. For example, the data processor 212 can send the call or SMS events to the one or more of the servers 112 via the network 108 of FIG. 1.

Alternatively, in response to the incoming or outgoing call or SMS message 702, the mobile device provides call and SMS notifications to the adaptive metering controller 106. In some examples, the meter selector 206 selects an example eighth meter, and the data collector 208 can obtain the call and SMS notifications using the eighth meter. In such examples, at the call or SMS event generation 708, the adaptive metering controller 106 generates the call or SMS events based on the call and SMS notifications and/or based on data from an application class (e.g., AudioManager, MediaSession, etc.) of the mobile device. For example, the mapping controller 210 of FIG. 2 can select an example seventh mapping to map the call and SMS notifications to the call or SMS events. In some examples, in response to the sending of the call or SMS events 706, the data processor 212 provides, transmits and/or sends the generated call or SMS events to one or more of the servers 112. In the illustrated example, the call or SMS events based on the call logs are the same as or similar to the call or SMS events generated based on the call and SMS notifications. As such, in some examples, at the processing of the call and SMS events 710, the servers 112 similarly process the call or SMS events based on the call logs and notifications pertaining to the call and SMS.

Figure 8:
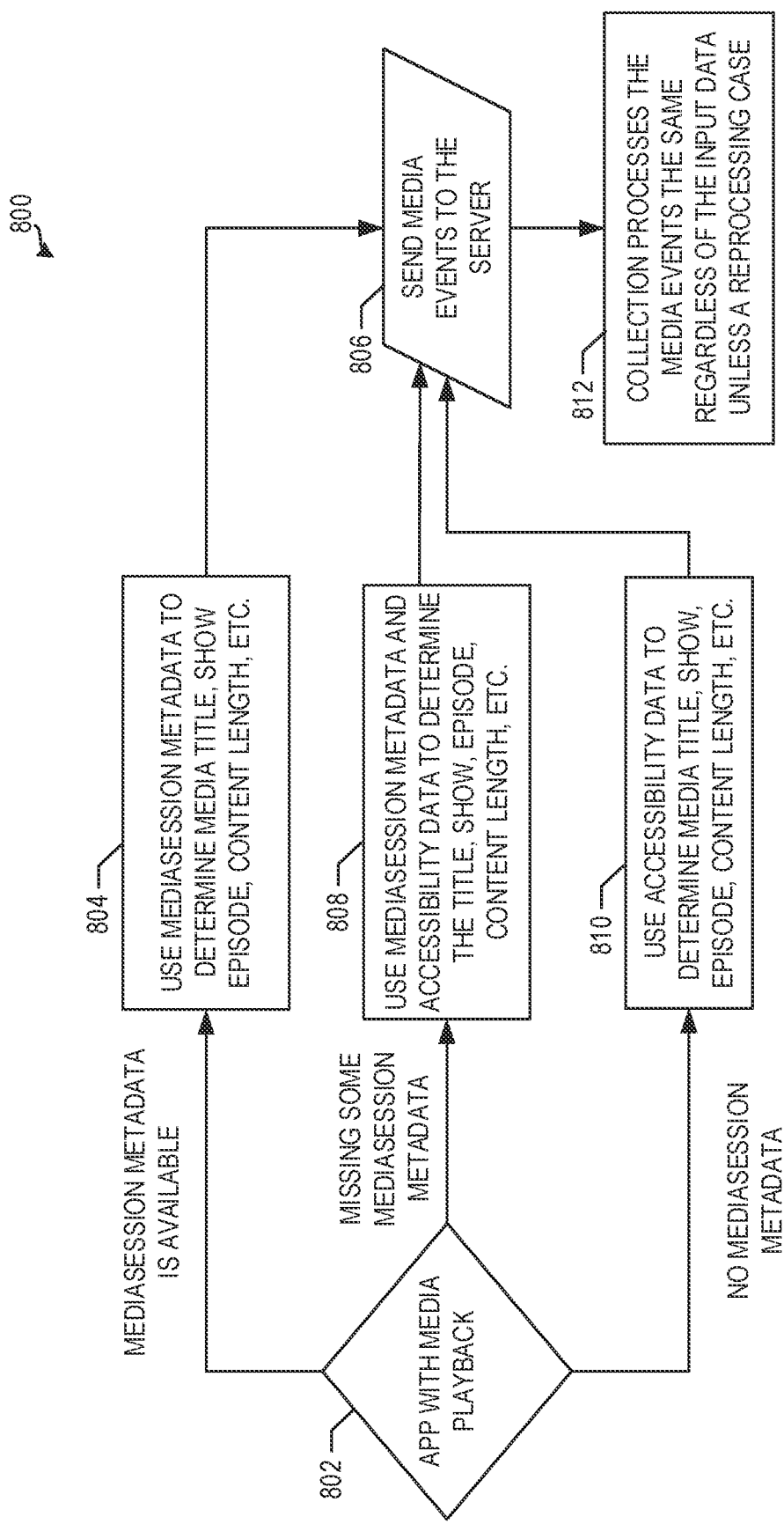
FIG. 8 is a block diagram of a ninth example process flow that can be implemented by the example adaptive metering controller of FIG. 2 to process media event data associated with an application of a mobile device.

FIG. 8 is a block diagram of a ninth example process flow 800 that can be implemented by the example adaptive metering controller 106 of FIG. 2 to process media event data associated with an application 802 of the mobile device (e.g., the media device 104 of FIG. 1). In this example, the application 802 is configured to present media to a user of the mobile device. In one example, in response to the application 802 presenting the media, metadata (e.g., MediaSession metadata) associated with the media is available to the adaptive metering controller 106. In such an example, the meter selector 206 of FIG. 2 selects an example ninth meter, and the data collector 208 of FIG. 2 can obtain the metadata using the ninth meter. The metadata may include information associated with the presented media, such as a media title, show episode, content length, etc. In such an example, at the obtaining of the metadata 804, the data processor 212 of FIG. 2 can determine the media event data based on the metadata, where the media event data can include the information associated with the presented media (e.g., the media title, the show episode, the content length, etc.). In this example, at the sending of the media events 806, the data processor 212 sends the media events to one or more of the servers 112 of the data processing facility 110 of FIG. 1. For example, the data processor 212 can send the media events to the one or more of the servers 112 via the network 108 of FIG. 1.

In another example, in response to the application 802 presenting the media, a portion of the metadata is available to the adaptive metering controller 106. In such an example, the meter selector 206 selects a combination of meters including the first meter of FIG. 4A and the ninth meter, for example. Accordingly, the data collector 208 of FIG. 2 can obtain the portion of the metadata using the ninth meter, and the data collector 208 can further obtain the accessibility data 402 of FIG. 4A using the first meter. In this example, at the obtaining of the accessibility data and metadata 808, the mapping controller 210 of FIG. 2 can select an example eighth mapping to map both the accessibility data 402 and the metadata to the media event data. The data processor 212 sends the media events to the one or more of the servers 112 at the sending of the media events 806.

In yet another example, in response to the application 802 presenting the media, the metadata can be unavailable to the adaptive metering controller 106. In such an example, the meter selector 206 selects the first meter, and the data collector 208 obtains the accessibility data 402 using the first meter. In this particular example, in response to obtaining the accessibility data 810, the mapping controller 210 selects the example first mapping 404 of FIG. 4 to map the accessibility data 402 to the media event data. In this example, the data processor 212 sends the media events to the one or more of the servers 112 at the sending of the media events 806. In the illustrated example, at or in response to the processing of the media events 712, the servers 112 similarly process the media events based on the metadata, the accessibility data 402, and/or a combination of the metadata and the accessibility data 402, etc.

While an example manner of implementing the adaptive metering controller 106 of FIG. 1 is illustrated in FIG. 2, one or more of the elements, processes and/or devices illustrated in FIG. 2 may be combined, divided, re-arranged, omitted, eliminated and/or implemented in any other way. Further, the example condition analyzer 204, the example meter selector 206, the example data collector 208, the example mapping controller 210, the example data processor 212, the example meter adjuster 214, and/or, more generally, the example adaptive metering controller 106 of FIG. 2 may be implemented by hardware, software, firmware and/or any combination of hardware, software and/or firmware. Thus, for example, any of the example condition analyzer 204, the example meter selector 206, the example data collector 208, the example mapping controller 210, the example data processor 212, the example meter adjuster 214 and/or, more generally, the example adaptive metering controller 106 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example condition analyzer 204, the example meter selector 206, the example data collector 208, the example mapping controller 210, the example data processor 212, and/or the example meter adjuster 214 is/are hereby expressly defined to include a non-transitory computer readable storage device or storage disk such as a memory, a digital versatile disk (DVD), a compact disk (CD), a Blu-ray disk, etc. including the software and/or firmware. Further still, the example adaptive metering controller 106 of FIG. 2 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 9:
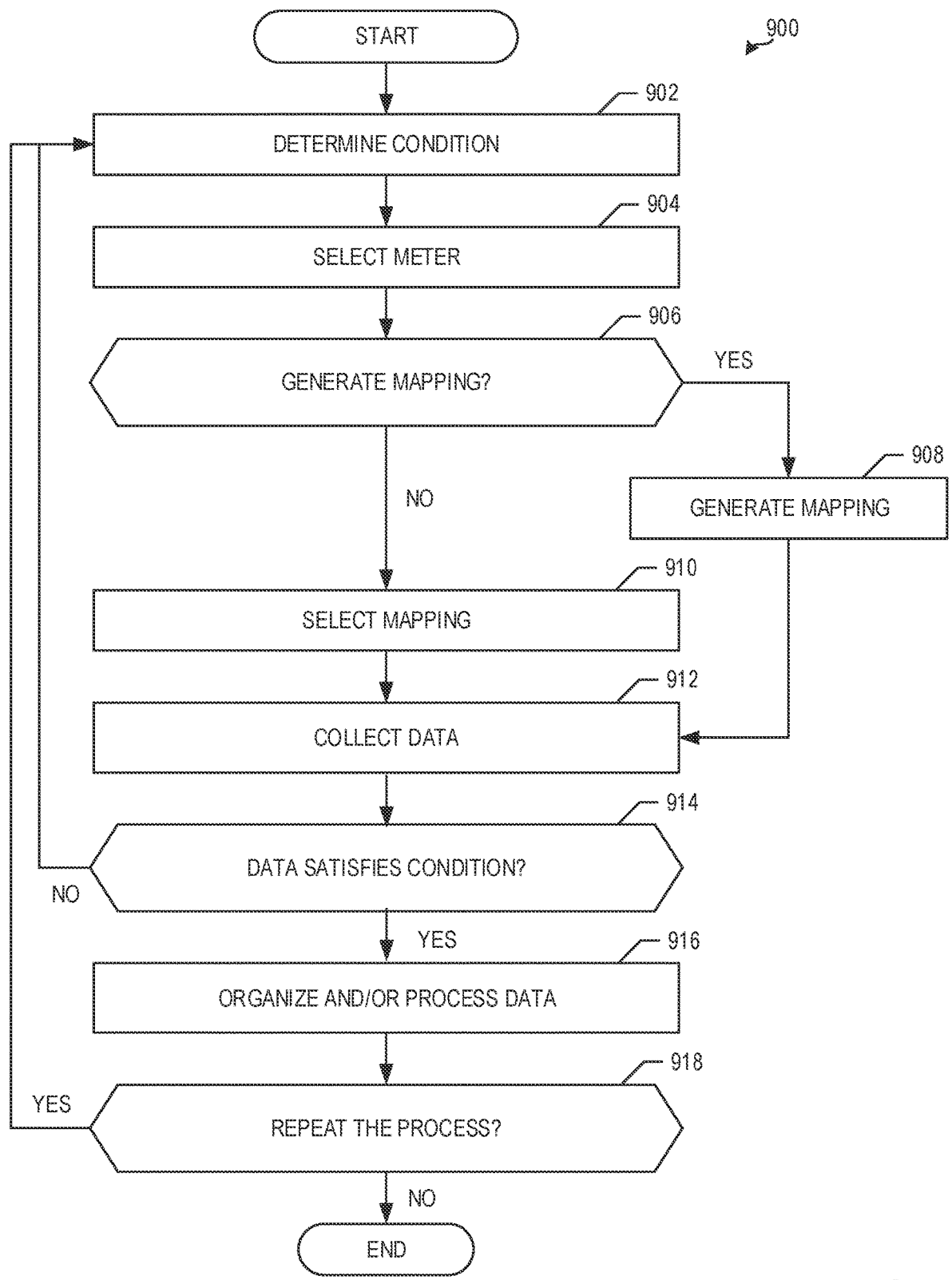
FIG. 9 is a flowchart representative of machine readable instructions which may be executed to implement examples disclosed herein.

A flowchart representative of example hardware logic, machine readable instructions, hardware implemented state machines, and/or any combination thereof for implementing the adaptive metering controller 106 of FIG. 2 is shown in FIG. 9. The machine readable instructions may be one or more executable programs or portion(s) of an executable program for execution by a computer processor and/or processor circuitry, such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIG. 9, many other methods of implementing the example adaptive metering controller 106 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example process of FIG. 9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 9 is a flowchart representative of machine readable instructions 900 which may be executed to implement examples disclosed herein. For example, the instructions 900 can be executed by the example adaptive metering controller 106 of FIG. 2 to collect data pertaining to a mobile device (e.g., the media device 104 of FIG. 1) using one or more meters. The instructions 900 begin as the adaptive metering controller 106 interfaces with the mobile device via the example data interface 216 of FIG. 2.

At block 902, the example adaptive metering controller 106 determines a condition associated with the mobile device. For example, the condition analyzer 204 of FIG. 2 determines the condition including at least one of a desired accuracy of the data to be monitored, a panel associated with the mobile device, or an availability of the one or more meters.

At block 904, the example adaptive meter controller 106 selects a meter from the one or more meters. For example, the example meter selector 206 of FIG. 2 selects the meter for the mobile device based on the condition. In some examples, the example meter selector 206 selects a combination of meters from the one or more meters based on the condition.

At block 906, the example adaptive meter controller 106 determines whether to generate a mapping. For example, in response to the example mapping controller 210 of FIG. 2 determining that the mapping is to be generated (e.g., block 906 returns a result of YES), the process proceeds to block 908. Alternatively, in response to the mapping controller 210 determining that the mapping is not to be generated (e.g., block 906 returns a result of NO), the process proceeds to block 910. In some examples, the mapping controller 210 determines that the mapping is to be generated in response to the meter selector 206 selecting the fifth meter, where the fifth meter corresponds to the network traffic data 602 of FIG. 6A.

At block 908, the example adaptive meter controller 106 generates the mapping. For example, the example mapping controller 210 generates the mapping based on a neural network model. In some examples, the mapping controller 210 stores the generated mapping in the example database 218 of FIG. 2.

At block 910, the example adaptive metering controller 106 selects the mapping from one or more generated mappings. For example, the mapping controller 210 selects the mapping based on the selected meter. In some examples, the mapping controller 210 selects the mapping from the example mappings 404, 410, 504, 510, 604, 610 described above in connection with FIGS. 4A, 4B, 5A, 5B, 6A, and/or 6B. In some examples, the mapping controller 210 selects a combination of mappings from the mappings 404, 410, 504, 510, 604, 610, where the combination of mappings corresponds to the combination of meters selected by the meter selector 206.

At block 912, the example adaptive metering controller 106 collects data pertaining to the mobile device. For example, the example data collector 208 of FIG. 2 collects the data based on the selected meter. In some examples, the collected data is associated with media presented at the mobile device. In some examples, the data collector 208 stores the collected data in the database 218.

At block 914, the example adaptive metering controller 106 determines whether the collected data satisfies the condition. For example, the example meter adjuster 214 of FIG. 2 determines whether the collected data is at the desired accuracy. In response to the example meter adjuster 214 determining that the collected data satisfies the condition (e.g., block 914 returns a result of YES), the process proceeds to block 916. Alternatively, in response to the example meter adjuster 214 determining that the collected data does not satisfy the condition (e.g., block 914 returns a result of NO), the process returns to block 902.

At block 916, the example adaptive metering controller 106 organizes and/or processes the collected data. For example, the data processor 212 obtains the example outputs 304 of FIG. 3 from the collected data, and sends the collected data and/or the example outputs 304 to the data processing facility 110 of FIG. 1 for further processing. In other examples, the mapping controller 210 uses the selected and/or generated mapping to generate the outputs 304 based on the collected data.

At block 918, the example adaptive metering controller 106 determines whether to repeat the process. For example, the condition analyzer 204 determines whether more data pertaining to the mobile device is to be collected. In response to the condition analyzer 204 determining that the process is to be repeated (e.g., block 918 returns a result of YES), the process returns to block 902. Alternatively, in response to the condition analyzer 204 determining that the process is to be repeated (e.g., block 918 returns a result of NO), the process ends.

Figure 10:
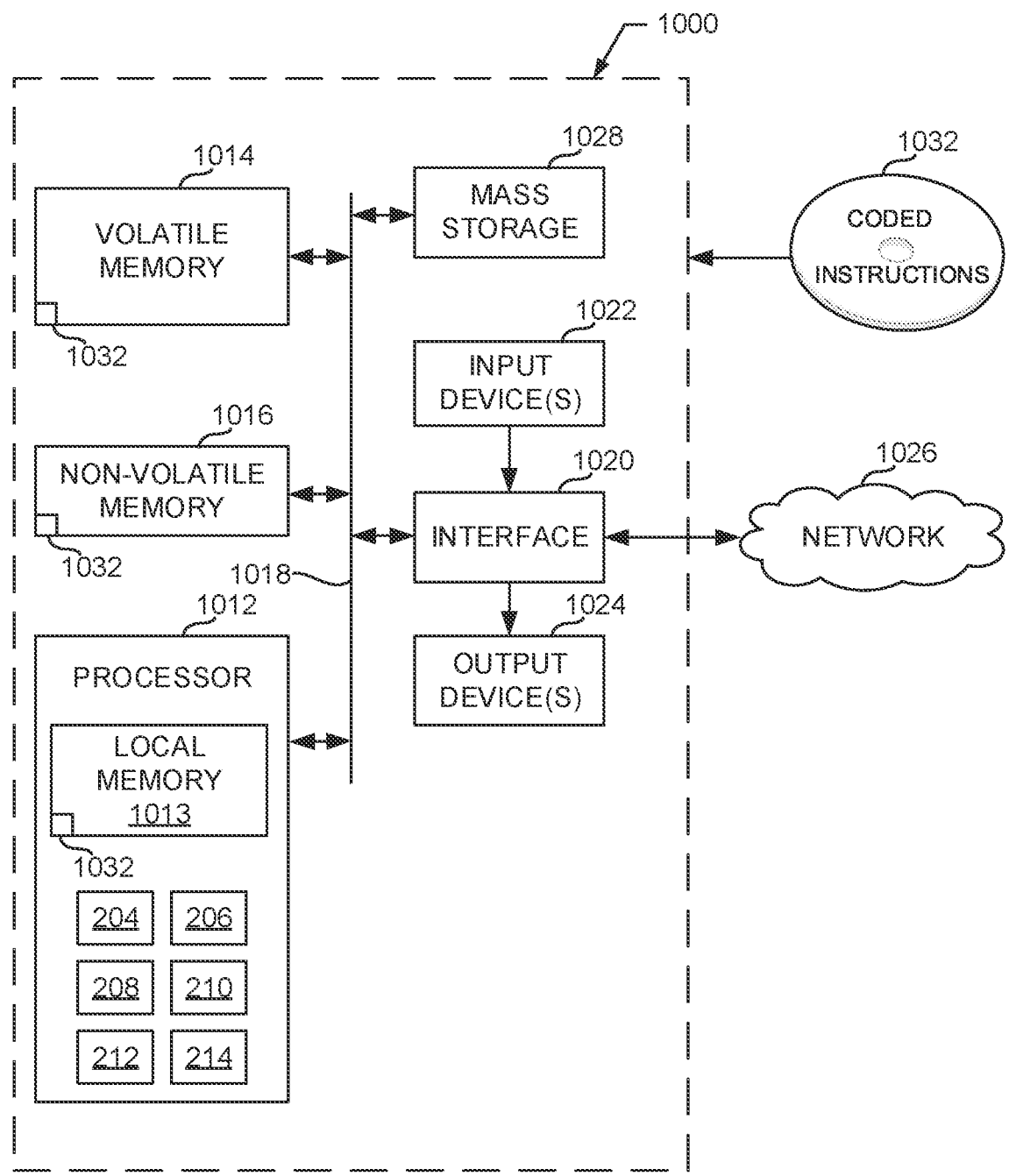
FIG. 10 is a block diagram of an example processing platform structured to execute the instructions of FIG. 7 to implement the example adaptive metering controller of FIG. 2.

FIG. 10 is a block diagram of an example processor platform 1000 structured to execute the instructions of FIG. 9 to implement the adaptive metering controller 106 of FIG. 2. The processor platform 1000 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example condition analyzer 204, the example meter selector 206, the example data collector 208, the example mapping controller 210, the example data processor 212, and the example meter adjuster 214.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIG. 9 may be stored in the mass storage device 1028, in the volatile memory 1014, in the non-volatile memory 1016, and/or on a removable non-transitory computer readable storage medium such as a CD or DVD.

From the foregoing, it will be appreciated that example methods, apparatus and articles of manufacture have been disclosed that provide adaptive metering of data pertaining to a mobile device. Examples disclosed herein enable an adaptive metering controller to adaptively configure the number and/or type of meters used for collecting data. The disclosed methods, apparatus and articles of manufacture improve the efficiency of using a computing device by enabling continuous (e.g., without interruption) monitoring of media content on the mobile device while ensuring that the collected data satisfies a desired accuracy. The disclosed methods, apparatus and articles of manufacture are accordingly directed to one or more improvement(s) in the functioning of a computer.

Example 1 includes an apparatus including a condition analyzer to determine a condition associated with a mobile device, a meter selector to select a meter for the mobile device based on the condition, and a data collector to collect data pertaining to the mobile device based on the selected meter.

Example 2 includes the apparatus of Example 1, and further includes a mapping controller to map the data to one or more outputs, the one or more outputs associated with media presented on the mobile device.

Example 3 includes the apparatus of Example 2, where the mapping controller is to map the data to the one or more outputs via at least one of a machine learning model or a neural network model.

Example 4 includes the apparatus of Example 2, where the one or more outputs identify at least one of a user, a show, a season, an episode, a start time, an end time, a media type, an audio language, or a player associated with the media.

Example 5 includes the apparatus of Example 1, where the data is collected using at least one of an accessibility service, intent filters, firmware, an external device associated with the mobile device, user-generated inputs, or network traffic.

Example 6 includes the apparatus of Example 5, where the external device includes at least one of a video or a microphone, the data to include at least one of audio data, video data, or image data.

Example 7 includes the apparatus of Example 1, where the condition includes at least one of a desired accuracy of the data or a panel associated with the mobile device.

Example 8 includes the apparatus of Example 1, where the data is associated with at least one of an incoming call to the mobile device, an outgoing call from the mobile device, an incoming SMS message to the mobile device, or an outgoing SMS message from the mobile device.

Example 9 includes the apparatus of Example 1, where the data is associated with media presented by an application of the mobile device.

Example 10 includes an apparatus including a memory storing instructions and a processor to execute the instructions to determine a condition associated with a mobile device, select a meter for the mobile device based on the condition, and collect data pertaining to the mobile device based on the selected meter.

Example 11 includes the apparatus of Example 10, where the processor is to map the data to one or more outputs, the one or more outputs associated with media presented on the mobile device.

Example 12 includes the apparatus of Example 11, where the processor is to map the data to the one or more outputs by mapping the data via at least one of a machine learning model or a neural network model.

Example 13 includes the apparatus of Example 11, where the one or more outputs identify at least one of a user, a show, a season, an episode, a start time, an end time, a media type, an audio language, or a player associated with the media.

Example 14 includes the apparatus of Example 10, where the processor is to collect the data by collecting the data using at least one of an accessibility service, intent filters, firmware, an external device associated with the mobile device, user-generated inputs, or network traffic.

Example 15 includes the apparatus of Example 14, where the external device includes at least one of a video or a microphone, the data to include at least one of audio data, video data, or image data.

Example 16 includes the apparatus of Example 10, where the processor is to determine the condition by determining at least one of a desired accuracy of the data or a panel associated with the mobile device.

Example 17 includes a non-transitory computer readable medium including instructions that, when executed, cause at least one processor to determine a condition associated with a mobile device, select a meter for the mobile device based on the condition, and collect data pertaining to the mobile device based on the selected meter.

Example 18 includes the non-transitory computer readable medium of Example 17, where the instructions, when executed, cause the at least one processor to map the data to one or more outputs, the one or more outputs associated with media presented on the mobile device.

Example 19 includes the non-transitory computer readable medium of Example 18, where the instructions, when executed, cause the at least one processor to map the data to the one or more outputs via at least one of a machine learning model or a neural network model.

Example 20 includes the non-transitory computer readable medium of Example 18, where the instructions, when executed, cause the at least one processor to identify at least one of a user, a show, a season, an episode, a start time, an end time, a media type, an audio language, or a player associated with the media.

Example 21 includes the non-transitory computer readable medium of Example 17, where the instructions, when executed, cause the at least one processor to collect the data using at least one of an accessibility service, intent filters, firmware, an external device associated with the mobile device, user-generated inputs, or network traffic.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   condition analyzer circuitry to:
      determine an accuracy threshold of data to be collected from a mobile device; and
      determine a panel to which a user of the mobile device belongs;
   meter selector circuitry to select a number of meters and meter types for one or more meters to be used with the mobile device based on the accuracy threshold and the panel; and
   data collector circuitry to collect the data pertaining to the mobile device based on the selected number of meters and the selected meter types.

2. The apparatus of claim 1, further including mapping controller circuitry to map the data to one or more outputs, the one or more outputs associated with media presented on the mobile device.

3. The apparatus of claim 2, wherein the mapping controller circuitry is to map the data to the one or more outputs via at least one of a machine learning model or a neural network model.

4. The apparatus of claim 2, wherein the one or more outputs identify at least one of a user, a show, a season, an episode, a start time, an end time, a media type, an audio language, or a player associated with the media.

5. The apparatus of claim 1, wherein the data collector circuitry is to collect the data with at least one of an accessibility service, intent filters, firmware, an external device associated with the mobile device, user-generated inputs, or network traffic.

6. The apparatus of claim 5, wherein the data collector circuitry is to collect the data with the external device, the external device including at least one of a camera or a microphone, the data to include at least one of audio data, video data, or image data.

7. The apparatus of claim 1, wherein the data is associated with at least one of an incoming call to the mobile device, an outgoing call from the mobile device, an incoming SMS message to the mobile device, or an outgoing SMS message from the mobile device.

8. The apparatus of claim 1, wherein the data is associated with media presented by an application of the mobile device.

9. An apparatus comprising:
a memory storing instructions; and
a processor to execute the instructions to:
determine an accuracy threshold of data to be collected from a mobile device;
determine a panel to which a user of the mobile device belongs;
select a number of meters and meter types for one or more meters to be used with the mobile device based on the accuracy threshold and the panel; and
collect the data pertaining to the mobile device based on the selected number of meters and the selected meter types.

10. The apparatus of claim 9, wherein the processor is to execute the instructions to map the data to one or more outputs, the one or more outputs associated with media presented on the mobile device.

11. The apparatus of claim 10, wherein the processor is to execute the instructions to map the data to the one or more outputs by mapping the data via at least one of a machine learning model or a neural network model.

12. The apparatus of claim 10, wherein the one or more outputs identify at least one of a user, a show, a season, an episode, a start time, an end time, a media type, an audio language, or a player associated with the media.

13. The apparatus of claim 9, wherein the processor is to execute the instructions to collect the data by collecting the data with at least one of an accessibility service, intent filters, firmware, an external device associated with the mobile device, user-generated inputs, or network traffic.

14. The apparatus of claim 13, wherein the external device includes at least one of a camera or a microphone, the data to include at least one of audio data, video data, or image data.

15. A non-transitory computer readable medium comprising instructions that, when executed, cause at least one processor to:
determine an accuracy threshold of data to be collected from a mobile device;
determine a panel to which a user of the mobile device belongs;
select a number of meters and meter types for one or more meters to be used with the mobile device based on the accuracy threshold and the panel; and
collect the data pertaining to the mobile device based on the selected number of meters and the selected meter types.

16. The non-transitory computer readable medium of claim 15, wherein the instructions, when executed, cause the at least one processor to map the data to one or more outputs, the one or more outputs associated with media presented on the mobile device.

17. The non-transitory computer readable medium of claim 16, wherein the instructions, when executed, cause the at least one processor to map the data to the one or more outputs via at least one of a machine learning model or a neural network model.

18. The non-transitory computer readable medium of claim 16, wherein the instructions, when executed, cause the at least one processor to identify at least one of a user, a show, a season, an episode, a start time, an end time, a media type, an audio language, or a player associated with the media.

19. The non-transitory computer readable medium of claim 15, wherein the instructions, when executed, cause the at least one processor to collect the data with at least one of an accessibility service, intent filters, firmware, an external device associated with the mobile device, user-generated inputs, or network traffic.

* * * * *